United States Patent
Rakshit et al.

(10) Patent No.: US 10,755,615 B2
(45) Date of Patent: Aug. 25, 2020

(54) SELF-LEARNING DEFORMING DISPLAY

(71) Applicant: International Business Machines Corporation, Armonk, NY (US)

(72) Inventors: Sarbajit K. Rakshit, Kolkata (IN); Sathya Santhar, Ramapuram (IN); Samuel M. Jawaharlal, Chennai (IN); Balamurugaramanathan Sivaramalingam, Paramakudi (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 16/181,465

(22) Filed: Nov. 6, 2018

(65) Prior Publication Data

US 2020/0143720 A1    May 7, 2020

(51) Int. Cl.

| G06F 3/041 | (2006.01) |
|---|---|
| G09G 3/00 | (2006.01) |
| G06F 1/16 | (2006.01) |
| G06F 3/01 | (2006.01) |
| G06N 20/00 | (2019.01) |

(52) U.S. Cl.
CPC .......... *G09G 3/003* (2013.01); *G06F 1/1652* (2013.01); *G06F 3/016* (2013.01); *G06N 20/00* (2019.01); *G09G 2320/08* (2013.01); *G09G 2354/00* (2013.01); *G09G 2380/02* (2013.01)

(58) Field of Classification Search
CPC ............... G09G 3/003; G09G 2354/00; G09G 2380/02; G09G 2320/08; G06N 20/00; G06F 3/016; G06F 1/1652
See application file for complete search history.

(56) References Cited

U.S. PATENT DOCUMENTS

| 2014/0043291 A1 | 2/2014 | Ciesla et al. |
| 2014/0098075 A1* | 4/2014 | Kwak ................... G06F 3/0487 345/204 |
| 2016/0179230 A1 | 6/2016 | Rider et al. |
| 2017/0068318 A1 | 3/2017 | Mclure et al. |

* cited by examiner

*Primary Examiner* — Adam R. Giesy
(74) *Attorney, Agent, or Firm* — Schmeiser, Olsen & Watts; Brian M. Restauro

(57) ABSTRACT

An intelligent, self-learning display uses knowledgebase rules to determine how to deform its flexible, touch-sensitive upper surface into a three-dimensional representation of displayed content. The upper surface is deformed by selectively inflating balloons, pistons, or other devices embedded into a lower layer of the display, such that the inflated devices exert upward pressure on specific regions of the surface. The flexible upper surface consists of two sublayers that each contain a grid of small strips. The two grids are skewed such that the lower-sublayer strips fill in otherwise-visible gaps between upper-sublayer strips during a deformation. A user may use tactile feedback to adjust characteristics of the deformation, such as the deformation's height. A machine-learning mechanism records user adjustments in a corpus that is then used to train the display to more accurately deform its surface when representing three-dimensional content.

19 Claims, 7 Drawing Sheets

SELF-LEARNING DEFORMING DISPLAY

BACKGROUND

The present invention relates in general to electronic-device displays and in particular to an intelligent deformable display that can learn to automatically deform its surface in response to user feedback.

Electronic displays, such as smartphone screens, flat-panel televisions, and computer monitors, can be manufactured from flexible materials like OLEDs (organic light-emitting diodes) that allow a display to be folded, rolled, and deformed in other ways. These materials cannot, however, be stretched or elongated in order to compensate for spatial distortions that arise when a display surface is deformed.

SUMMARY

An embodiment of the present invention is a self-learning electronic display system comprising a a deformable display surface. The system, in response to determining that a displayed image comprises a three-dimensional visual element, deforms the deformable display surface by raising or lowering an area of the deformable display surface that represents the visual element. In response an external physical pressure exerted upon the deformable surface, the system adjusts the height of at least a portion of the area. The system records characteristics of the visual element, of the deformation, of the external physical pressure, and of the resulting adjustment and these characteristics are used by a machine-learning training program to teach the self-learning display how to be more accurately deform the surface in the future.

Another embodiment of the present invention is a method for a self-learning deforming display system. This method comprises the system, in response to determining that a displayed image comprises a three-dimensional visual element, deforms the deformable display surface by raising or lowering an area of the deformable display surface that represents the visual element. In response an external physical pressure exerted upon the deformable surface, the system adjusts the height of at least a portion of the area. The system records characteristics of the visual element, of the deformation, of the external physical pressure, and of the resulting adjustment and these characteristics are used by a machine-learning training program to teach the self-learning display how to be more accurately deform the surface in the future.

Yet another embodiment of the present invention is a computer program product including a computer-readable storage medium storing computer-readable program code that is compatible with a self-learning deforming display system that includes a processor, a memory coupled to the processor, and a computer-readable hardware storage device coupled to the processor. The stored program code is configured to be run by the processor via the memory to perform a method for a self-learning deforming display. This method comprises the system, in response to determining that a displayed image comprises a three-dimensional visual element, deforms the deformable display surface by raising or lowering an area of the deformable display surface that represents the visual element. In response an external physical pressure exerted upon the deformable surface, the system adjusts the height of at least a portion of the area. The system records characteristics of the visual element, of the deformation, of the external physical pressure, and of the resulting adjustment and these characteristics are used by a machine-learning training program to teach the self-learning display how to be more accurately deform the surface in the future.

DETAILED DESCRIPTION

Figure 1:
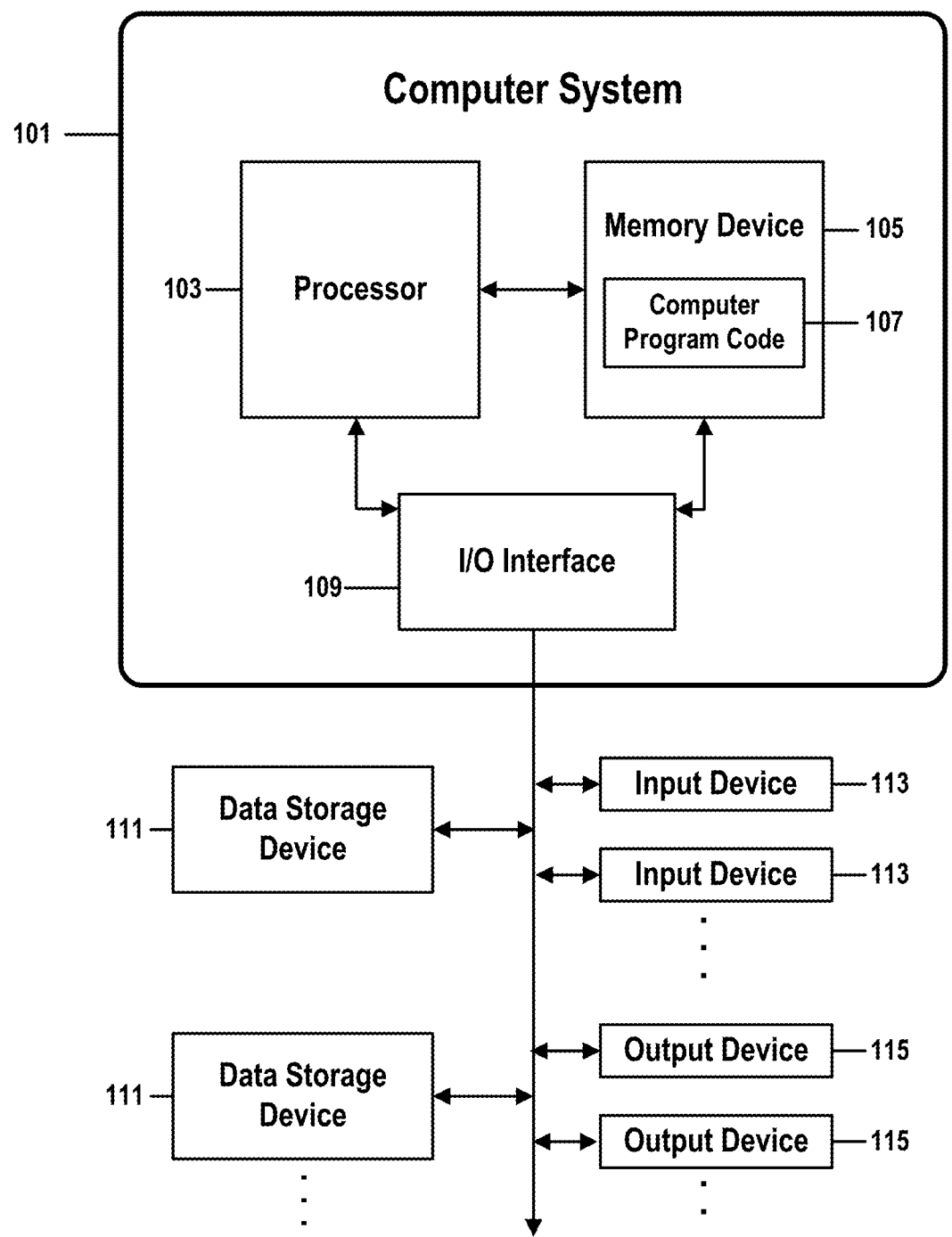
FIG. 1 shows the structure of a computer system and computer program code that may be used to implement a method for a self-learning deforming display in accordance with embodiments of the present invention.

Electronic displays that are manufactured from flexible materials can be folded, rolled, and deformed in other ways. These materials cannot, however, be stretched or elongated in order to compensate for spatial distortions that arise when a region of a display surface is deformed.

Current display technology also suffers from an inability to always accurately estimate a correct height or degree of a vertical deformation. A correct height may depend upon characteristics of a graphical, photographic, or video element being displayed, of a reason why an element is displayed (such as a requirement to conceal an entered password from passersby), of a physical size, resolution, or other physical characteristic of the display itself, of a characteristic of a software application, or of a particular preference of a certain user. Known deformable displays, if they address these issues at all, do so in only the most fundamental or general way.

Embodiments of the present invention include systems and methods for a self-learning deforming display. In its default state, this display presents a smooth flat or curved surface to users. But the display may also raise areas of the surface to various heights perpendicular to the default plane of the surface. When deformed, such a display may, like a bas-relief, produce a three-dimensional representation of a texture, graphic, image, or video.

For example, during a computerized slide show, the display may raise text above the default plane of the display. When displaying an animation or video of a ball rolling toward the viewing position, the display would increasingly raise areas of the screen that represent the ball, so that those areas move toward the viewer as the ball rolls closer. If an application requests a user to enter a confidential access code, the application could direct the screen to raise areas of the screen around the entry field, so as to conceal the code from unauthorized observers. A consumer wallpaper-selection application could use the invention's deformation capabilities to display a tactile, three-dimensional representation of a textured wallpaper. Similarly, a 3D graphics program or 3D printer could display a true three-dimensional representation of a textured surface or of certain types of 3D objects, allowing those representations to be physically felt on the surface of the screen by a user.

The present invention is flexible enough to accommodate embodiments that implement many other types applications that would benefit from such three-dimensional deformations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for a self-learning deforming display in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for a self-learning deforming display in accordance with embodiments of the present invention, and may implement other embodiments described in this specification, including the methods illustrated in FIGS. 1-7. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for a self-learning deforming display.

Any of the components of the present invention could be created, integrated, hosted, maintained, deployed, managed, serviced, supported, etc. by a service provider who offers to facilitate a method for a self-learning deforming display. Thus the present invention discloses a process for deploying or integrating computing infrastructure, comprising integrating computer-readable code into the computer system 101, wherein the code in combination with the computer system 101 is capable of performing a method for a self-learning deforming display.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for a self-learning deforming display may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for a self-learning deforming display is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
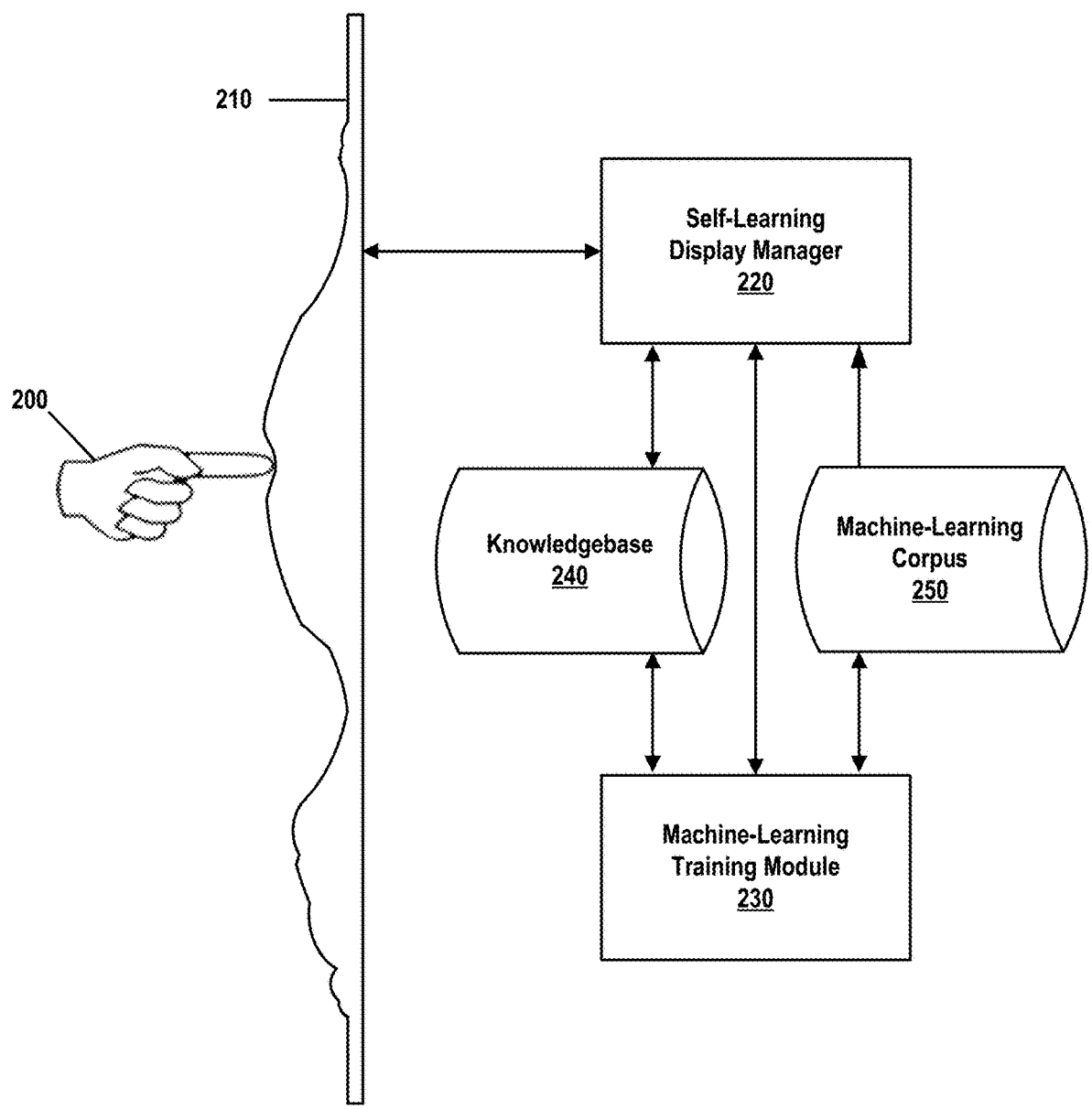
FIG. 2 shows the logical structure of a self-learning deforming display system that may be implemented on the platform shown in FIG. 1.

FIG. 2 shows a logical structure of a self-learning deforming display system that may be implemented on the platform shown in FIG. 1. FIG. 2 shows objects 200-250.

Deforming display 210 is shown in a side view that illustrates how the surface of the screen may be deformed such that areas of the screen are extruded to various heights above a default plane of the display.

Display 210 may be made from any combination of materials known in the art, such as organic LEDs (OLEDs) used in active matrix organic-light-emitting-diode (AMO-LED) displays. The display 210 may, in its default state, assume a completely flat, planar configuration, a curved surface (such as the surface of a curved HDTV), or any other default shape desired by an implementer and possible with known manufacturing methods.

For purposes of clarity, this document refers to deformations that raise areas of the display 210 to a height above a "default plane" of the display 210. This language should not be construed to limit embodiments of the present invention to displays that are, in their default state, completely flat. In such references, readers may construe a "default plane" to be limited to a small area of a display 210, such that a reference to a "height" of a deformation refers to a distance of the deformed surface from the nondeformed, "default" position of the surface of the small area, in a direction orthogonal to the nondeformed surface of the small area.

In some embodiments, the deformable surface may be composed of one or more grids of "unit display strips" that are each capable of being raised above the default plane of the surface. As will be described in the remaining FIG-URES, each may also be capable of bending to conform to upward pressure exerted from lower layers of the display.

A user gesture or other type of tactile feedback 200 may be exerted on the touch-sensitive surface of the display 210 to manually modify a deformation of the display surface. Examples of such gestures and feedback include a manual pressure exerted by a finger or stylus, a single- or multi-finger touch, gesture, or swipe, or a two-handed gesture in which one gesture provides context or meaning to the second gesture. This last example could be used for functions like allowing a user to simultaneously use one hand to apply a degree of pressure that specifies to display manager 220 an amount of change to be made to a height of a deformation, and to use the other hand to input a gesture that specifies whether that change should increase the height of the deformation or decrease the height of the deformation. A similar procedure could be used to direct the display manager 220 to deform a region of display 210 that is currently in its nondeformed default state and to specify a deformation height.

Self-learning display manager 220 controls the operation of display 210. This operation includes analyzing displayed content in order to determine whether regions of display 210 should be deformed while displaying that content, deforming regions of display 210, receiving and analyzing user feedback that is entered by a user in response to a deformation or that is entered in order to specify that a deformation should be created, and performing conventional display functions like displaying a video, a screen of an application, or other content.

Self-learning display manager 220 may be artificially intelligent or may be trainable using known methods of machine learning. This artificial intelligence or machine-learning is directed toward training the display manager 220 to automatically determine when areas of display 210 should be deformed as a function of content being displayed, and to automatically determine a region and height of each deformation.

In certain embodiments, display manager 220 determines how to respond to user feedback or determines when or how to deform display 210 by following rules stored in a knowledgebase 240. Knowledgebase rules may have been determined through prior machine-learning sessions or as a function of previous deformations or of results of user feedback received in response to previous deformations.

Display manager 220 also responds to receipt of a user feedback 200 to a deformation by recording the reason the deformation was made, characteristics of the deformation, and characteristics of the feedback. This recorded information may be forwarded to a machine-learning training module 230 or may be used by the display manager 220 to update rules stored in the knowledgebase 240. The training module 230 may store all or part of the received information in a training corpus 250 that is later used to train the display manager 220 to deform the display 210 more accurately or efficiently.

Training module 230 at times uses information stored in the training corpus 250 to train display manager 220, using known machine-learning training methods. During these training sessions, display manager 220 or training module 230 may update rules stored in the knowledgebase 240 as a function of information stored in the corpus 250, or as a function of behavior of the display manager 220 determined by existing rules of the knowledgebase 240.

The overall mechanism shown in FIG. 2, therefore, is of a cognitive display manager 220 software module that stores rules governing how to deform the surface of a display 210 in a knowledgebase 240. The rules may be updated by display manager 220 in response to receipt of user feedback 200 to a deformation and are also updated during machine-learning training sessions conducted by a training module 230, using data stored in a machine-learning training corpus 250.

Figure 3A:
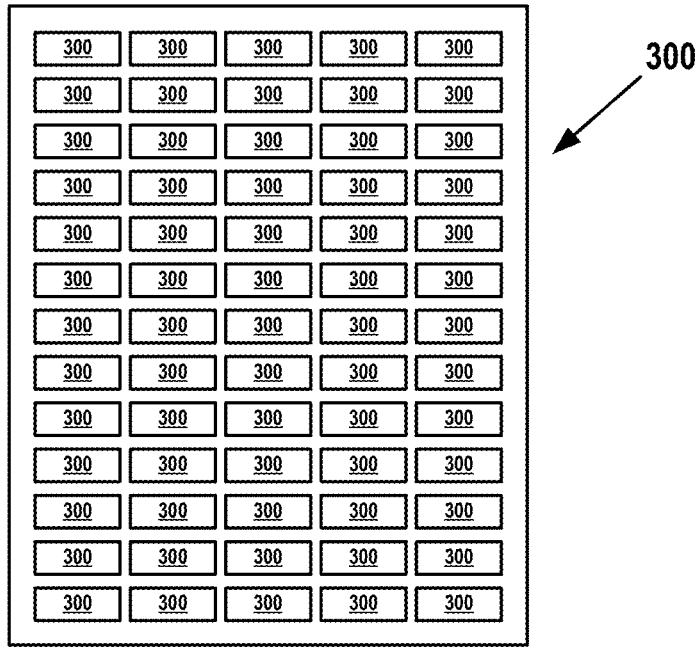
FIG. 3A shows unit display strips of an upper deforming layer of a self-learning deforming display.

FIG. 3A shows unit display strips 300 of an upper layer 3000 of a self-learning deforming display. FIG. 3A is not necessarily drawn to scale.

Each unit display strip 300 is composed of a display technology capable of displaying one or more pixels of content under control of display manager 220. Known display technologies include LCD displays, LED displays, and OLED displays. The present invention is flexible enough to accommodate either rigid display technologies like LCD or flexible, bendable technologies like OLED.

The unit display strips 300 may be as large or as small as is desired by an implementer, and each strip 300 may comprise as large a portion of display 210 as is desired by the implementer. For example, a 8,294,400-pixel 3840× 2160-resolution display may comprise a grid of 5,184 400× 400-resolution unit strips 300, a grid of 25,920 80×4-resolution unit strips 300, or even a grid of 8,294,400 single-pixel unit strips 300.

Figure 3B:
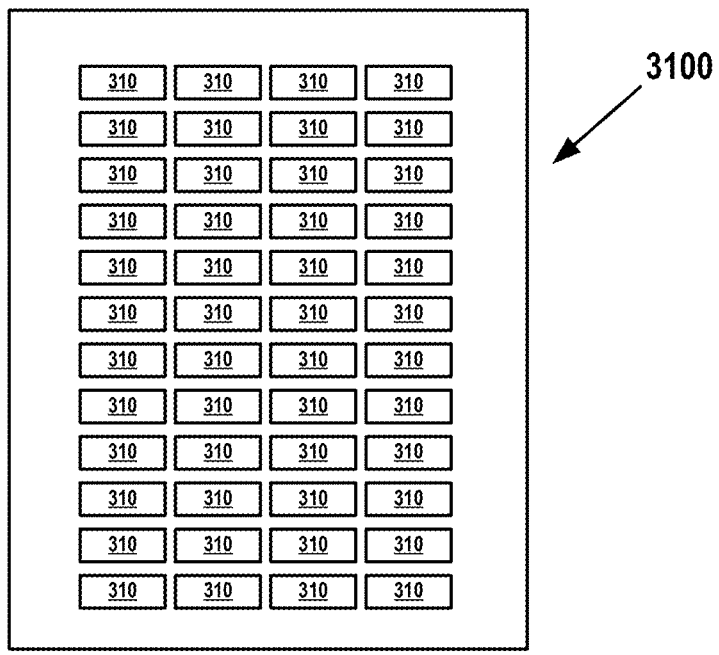
FIG. 3B shows unit display strips of a lower deforming layer of a self-learning deforming display.

FIG. 3B shows unit display strips 310 of a lower layer 3100 of a self-learning deforming display. FIG. 3A is not necessarily drawn to scale.

Like the upper-layer unit display strips 310, each lower-layer display strip 310 is composed of a rigid or bendable display technology capable of displaying one or more pixels of content under control of display manager 220.

Also like the upper-layer unit display strips 310, unit display strips 310 may be as large or as small as is desired by an implementer, and each strip 310 may comprise as large a portion of display 210 as is desired by the implementer.

Figure 4:
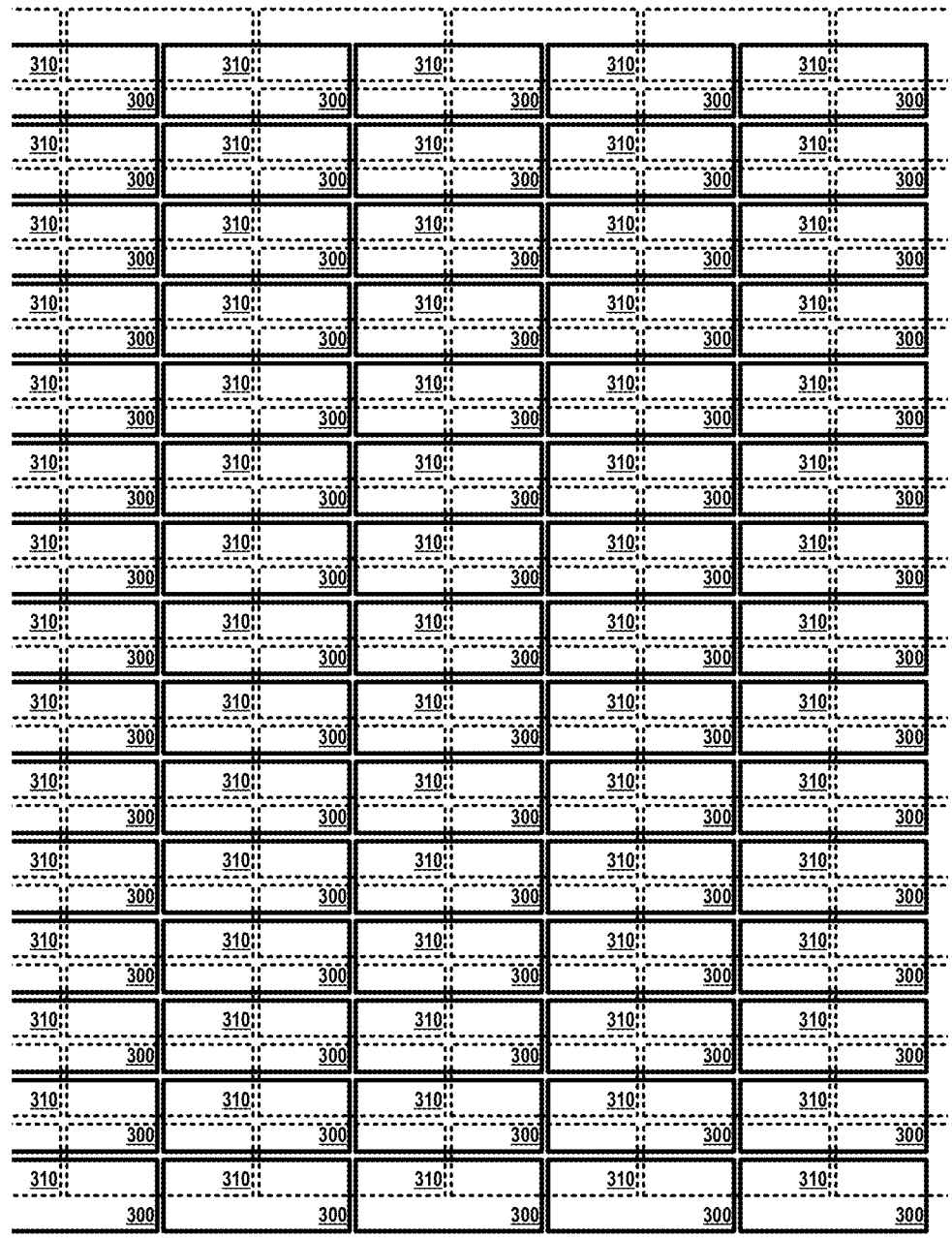
FIG. 4 is a front view of a region of the two-layer deformable display that shows the overlapping orientation of deforming layers.

As will be shown in FIG. 4, lower-layer strips 310 are offset from upper-layer strips 300 within the plane of the surface of display 210, such that a user viewing the display during normal operation would see only portions of the lower-layer strips 310 in the gaps between upper-layer strips 300. If the two layers each display synchronized content, the user would not be able to see the gaps between the upper-layer strips 300 from a normal viewing position.

FIG. 4 is a front view of a region of the two-layer deformable display 220 showing the overlapping orientation of layers. FIG. 4 comprises elements 300-310, which are identical in form and function to similarly numbered elements of FIG. 3.

FIG. 4 represents the region of display 220, as the region would be seen by a user from a conventional viewing position, looking through upper-layer unit strips 300 of upper layer 3000 to lower-layer unit strips 310 of lower layer 3100. Upper-layer unit strips 300 are shown with solid outlines and lower-layer unit strips 310 are shown with dotted outlines.

It can be seen from the figure that the upper-layer strips 300 are offset from the lower-layer strips 310 such that a gap between a pair of upper-layer strips 300 are filled in by lower-layer strips 310 located behind the pair of upper-layer strips 300.

In order to illustrate this geometry more clearly, certain elements of FIG. 4 are not drawn to scale. In certain real-world embodiments, the gaps between adjacent upper-layer strips 300 would be much smaller relative to the size of the upper-layer strips 300. Similarly, the gaps between adjacent lower-layer strips 310 could be much smaller relative to the size of the lower-layer strips 310. In such cases, an image presented to a viewer would appear to be seamless or nearly seamless from certain viewing angles when the display is in a default, nondeformed state.

Unit display strips 300 and 310 can be any shape desired by an implementer, such as rectangular, square, or nonrectilinear polygonal. In some embodiments, all display strips 300 or 310 are constrained to have a same shape or a same size.

In certain embodiments, upper layer 3000 may consist of transparent or semi-transparent unit display strips 300, such that areas of lower-layer display strips 310 that are behind unit display strips 300 are visible or partially visible to a viewer. In such embodiments, a user would not be able to discern that the displayed image is generated by two layers of display elements. Other embodiments may comprise or otherwise include transparent or semi-transparent unit display strips 300 and lower-layer display strips 310, or may comprise one or more other combinations of layers or strips.

When a region of display 220 is deformed, some spaces between upper-layer unit display strips 300 will expand as the upper-layer strips move away from each other to form the extruded or deformed surface. When this happens, the enlarged spaces would not be easily noticed by a viewer because areas of the lower-layer strips 310 that become visible through the enlarged spaces display content identical to content that would be displayed by the upper-layer strips 300 if the upper-layer strips 300 had filled the enlarged spaces.

In this way, the two-layer display 220 presents a seamless or gapless image despite deformations of the surface of the display 220. An embodiment of this mechanism is shown in greater detail in FIGS. 5A and 5B.

Figure 5A:
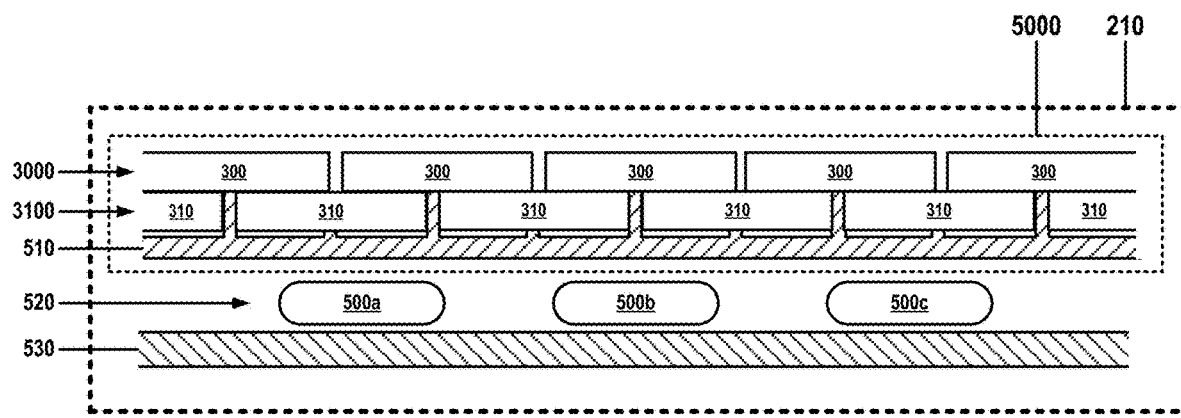
FIG. 5A shows a cross-section of a self-learning deforming display in a default state.

FIG. 5A shows a cross-section of a self-learning deforming display in a default state. FIG. 5A shows elements 210, 300-310, 500a-500c, 510-530, 3000-3100, and 5000. Elements 210, 300-310, and 3000-3100 are identical in form and function to similarly numbered elements of FIGS. 2-3A. The elements of FIG. 5A may not be drawn to scale in order to more clearly describe each element of the display 210.

Deformable display 210 is shown here to be composed of several layers. A deformable surface 5000 of the display 210 consists of an upper deformable layer 3000, the lower deformable layer 3100, and an elastic membrane 510 that helps hold elements of layers 3000 and 3100 in place and provides stability to deformed areas of the deformable surface 5000.

Some embodiments may include other layers. For example, some embodiments can include a top layer composed of a flexible transparent screen or a lens that helps hold the deformable layers together or helps maintain the precise registration necessary to align upper-layer strips 300 with lower-layer strips 310 as shown in FIG. 4. Other layers might include electrical components or wiring, power sources, cooling or airflow mechanisms, chassis components, polarization screens or other types of viewing filters, and other elements known in the art to be comprised by electronic displays.

As described in FIGS. 3A-4, upper layer 3000 contains upper-layer unit-display strips 300 that are each capable of displaying an area of the image being displayed by the entire display 210 and lower layer 3100 contains lower-layer unit-display strips 310 that are also each capable of displaying an area of the image being displayed by the entire display 210. When viewed by a user (as in the view of FIG. 4), lower-layer strips 310 are skewed with respect to the upper-layer strips 300 such that the lower-layer strips 310 fill in gaps between upper-layer strips 300 that might otherwise be visible to a viewer.

An array of inflatable mechanisms 500a-500c, such as balloons, are positioned beneath the deformable surface 5000. When inflated by the display manager 220, these balloons 500a-500c exert an upward pressure on an area the deformable surface 5000, raising the area to a certain height above the default plane of the display 210. When the display manager 220 deforms an area of the deformable surface 5000 that contains a certain subset of upper-layer strips 300 and lower-layer strips 310, the subset of strips is lifted as a unit.

The elastic membrane 510 underlying the two layers 3000 and 3100 is configured such that, when an area of the deformable surface 5000 is deformed by the inflation of one or more balloons 500a-500c, the elastic membrane 510 stretches to accommodate the movement of strips 300 and 310 in the deformed area. In some embodiments, electrical connections to each strip 300 or 310 may be routed to the strips through channels the elastic membrane 510.

A rigid backing 530 is located below the layer 520 of inflation mechanisms 500a-500c. This backing layer 530 provides support to the inflation mechanisms 500a-500c, allowing a deterministic amount of pressure to be exerted to the bottom of the deformable surface 5000 when a balloon 500a-500c is inflated.

An embodiment may comprise any number of inflation mechanisms, such as the balloons 500a-500c, that is desired by an implementer or that is necessitated by design goals or technical constraints. For example, one embodiment could comprise a balloon 500a-500c for each unit display strip 300 or 310, while another could comprise one balloon 500a-500c for each contiguous 2×10 subset of strips or for each 100×100 subset of strips.

Other embodiments are possible, such as a variable layout in which certain regions of display 210 contain a greater density of balloons than do other regions. For example, central regions of the display 210, or regions at which a viewer is most likely to focus attention, may have a greater density of inflation mechanisms 500a-500c than do regions closer to the outer edges of the display 210.

Any sort of inflation mechanisms 500a-500c known in the art may be incorporated into an embodiment. For example, a web of tiny conduits, pumps, and valves or switches may feed a matrix of balloons 500a-500c in layer 520, allowing the display manager 220 to select and inflate balloons 500a-500c as required to deform any area of the display 210. Other types of inflation mechanisms 500a-500c could include tiny hydraulic or air-driven piston-like devices, thermal inflation mechanisms, or devices that may be inflated by means of injection of a liquid or other noncompressible fluid.

In some cases, inflation mechanisms 500a-500c may be capable of being independently inflated, but in other embodiments, certain subsets of the inflation mechanisms 500a-500c may be linked or correlated, such that an entire subset of mechanisms 500a-500c can only be inflated or deflated as a group.

Peripheral mechanisms, such as pumps or fluid-storage reservoirs may be located in inflation layer 520, may situation in another area of display 210 or may be configured at a location external to the display 210.

Figure 5B:
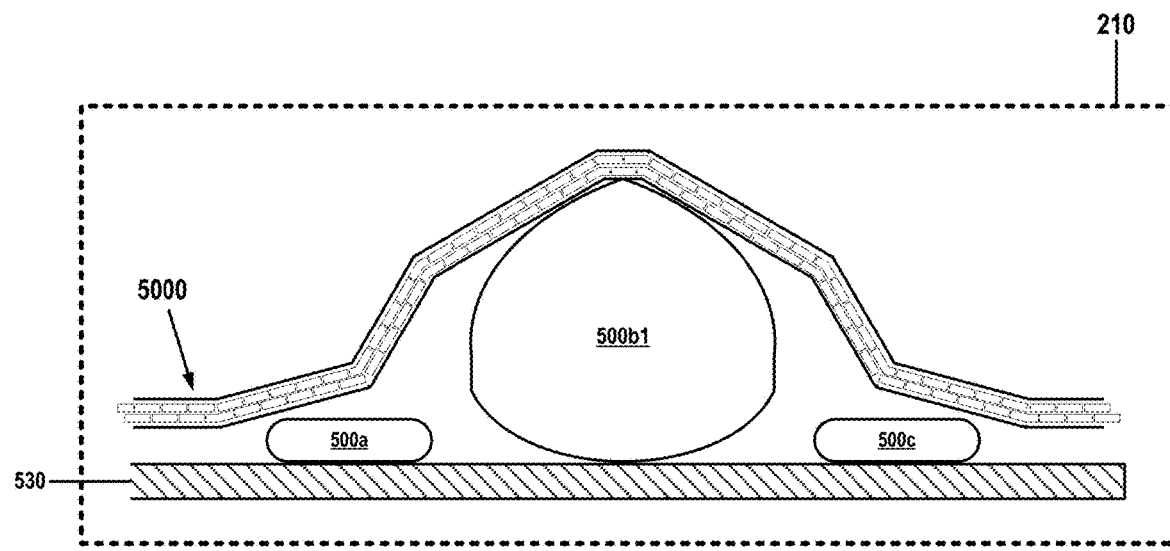
FIG. 5B shows a cross-section of a self-learning deforming display in a deformed state.

FIG. 5B shows an example of how the display 210 of FIG. 5A may be deformed by an embodiment of the present invention.

FIG. 5B shows a deformed cross-section of the area of the self-learning deforming display 210 shown in FIG. 5A. FIG. 5B shows elements 210, 500a, 500b1, 500c, 530, and 5000. Elements 210, 500a, 500c, 530, and 5000 are identical in form and function to similarly numbered elements of FIG. 5A. The elements of FIG. 5B may not be drawn to scale.

FIG. 5B shows how a region of deformable layer 210 is raised to a height above the default position shown in FIG. 5A. This deformation is created by pressure exerted through the transition of balloon 500b from its uninflated default state shown in FIG. 5A into the inflated state shown as item 500b1 in FIG. 5B.

Strips 300 and 310 located within the deformed area of deformable surface 5000 are stretched apart by the deformation, thereby increasing the size of the gaps between each display strip 300. These gaps are not visible to a viewer, however, because they merely allow the viewer to see portions of lower-layer strips 310 that are positioned behind the gaps. Because the strips 300 that comprise upper layer 3000 display the same image that is displayed by the strips 310 that comprise lower layer 3100, the lower-layer strips 310 merely fill in parts of the image that fall within gaps between the upper-layer strips 3100.

If made of a flexible material, unit display strips 300 and 310 may themselves bend when occupying a region of the deformable surface 5000 that has been deformed. In some embodiments, however, unit display strips 300 and 310 are rigid. In that case, a deformation changes the relative positions of the strips 300 and 310, but each strip 300 or 310 retains its original shape.

As described in FIG. 5A, although elastic membrane 510 deforms along the contour of a deformation, the elastic membrane 510 continues to hold each strip 300 and 310 in place during the deformation, and returns the strips 300 and 310 to their original default positions when the deformation is terminated. In some embodiments, elastic membrane 510 holds only lower-layer display strips 310 in place, allowing another mechanism or technology known in the art to hold upper-layer display strips 300 in place.

Figure 6:
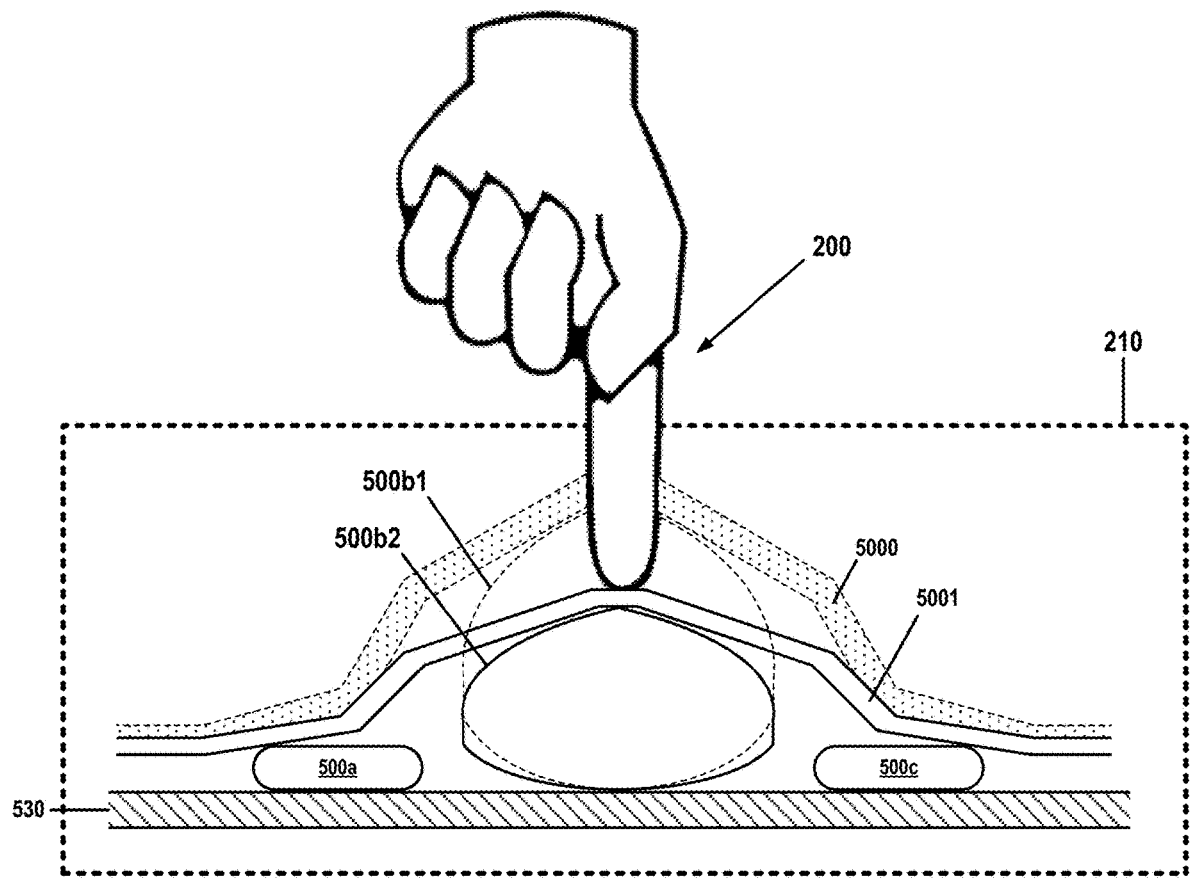
FIG. 6 shows a cross-section of a self-learning deforming display that is receiving tactile feedback while in a deformed state.

FIG. 6 shows a cross-section of a self-learning deforming display that is receiving tactile feedback while in a deformed state. FIG. 6 shows elements 200, 500a, 500b1, 500b2, 500c, 530, and 5000-5001. Elements 200, 500a, 500b1, 500c, 530, and 5000 are identical in form and function to similarly numbered elements of FIG. 5A. The elements of FIG. 6 may not be drawn to scale.

Here, a form of user feedback 200, such as finger or stylus pressure exerted upon a touch-sensitive surface of display 210, depresses the fully deformed surface 5000 of FIG. 5B into a partially deformed surface 5001. Accordingly, the fully inflated inflation mechanism 500b1 of FIG. 5B is reduced to a partially deflated state 500b2, thus allowing the deformable surface 210 to become partially deformed.

This mechanism allows a user to direct display manager 220 to alter the deformation shown in FIG. 5B. In one example, if a user exerts hand pressure on one area of the deformed region, the display manager 220 would deflate balloon 500b1 until the user ceases exerting the pressure.

A two-handed or multi-finger gesture could allow a user to submit more complex feedback to display manager 220. For example, a direction of a gesture made by one hand could specify whether a touch made by another hand should direct display manager 220 to increase a height of a deformation at the location of the touch or to decrease the height of the deformation at the location of the touch.

Many other types of user feedback are possible, such as a combination of finger pressure and a stylus-entered script command, a combination of finger pressure and a keyboard command, or a swipe in a particular direction terminated by static pressure on a deformed area of display 210.

These gestures and other types of user feedback may be used to direct display manager 220 to perform a variety of tasks related to the way in which display manager 220 deforms display 210. For example, one type of user feedback could tell display manager 220 that a first deformation should not be greater (or lesser) in height than a second deformation; that a height of a deformation is too great or too little; that a deformation should be terminated, allowing a deformed region of the display 210 to return to its default state; that a deformation should assume a different shape; or that a region of display 210 that is currently in its default state should be deformed to a particular height.

In some cases, display manager 220 will attempt to infer semantic meaning from the user feedback, or even attempt to relate a characteristic of a displayed image to the received feedback and to the resulting user modification to the display manager 220's original deformation. For example, if a user provides feedback that lowers the height of a deformation, display manager 220 would attempt to revise rules stored in knowledgebase 240 that had resulted in a decision to deform the screen to a particular height as a function of a certain contrast characteristic of a displayed image. The next time that display manager 220 displays an image with a similar contrast characteristic, the revised rule would then result in a deformation to a lesser height.

The user feedback may also be forwarded to machine-learning training module 230, which would then format meaningful information inferred from the feedback into a form that could be stored in corpus 250. This format might, for example, consist of a vector that relates an action of the display manager to deform display 210 with the user feedback that resulted from that action. In some embodiments, display manager 220 would itself format and store information inferred from the feedback into the corpus 250. In either case, the training module 230 would subsequently use the corpus to machine-train the display manager to more intelligently and accurately determine how to deform display 210 to best display particular types of images.

Figure 7:
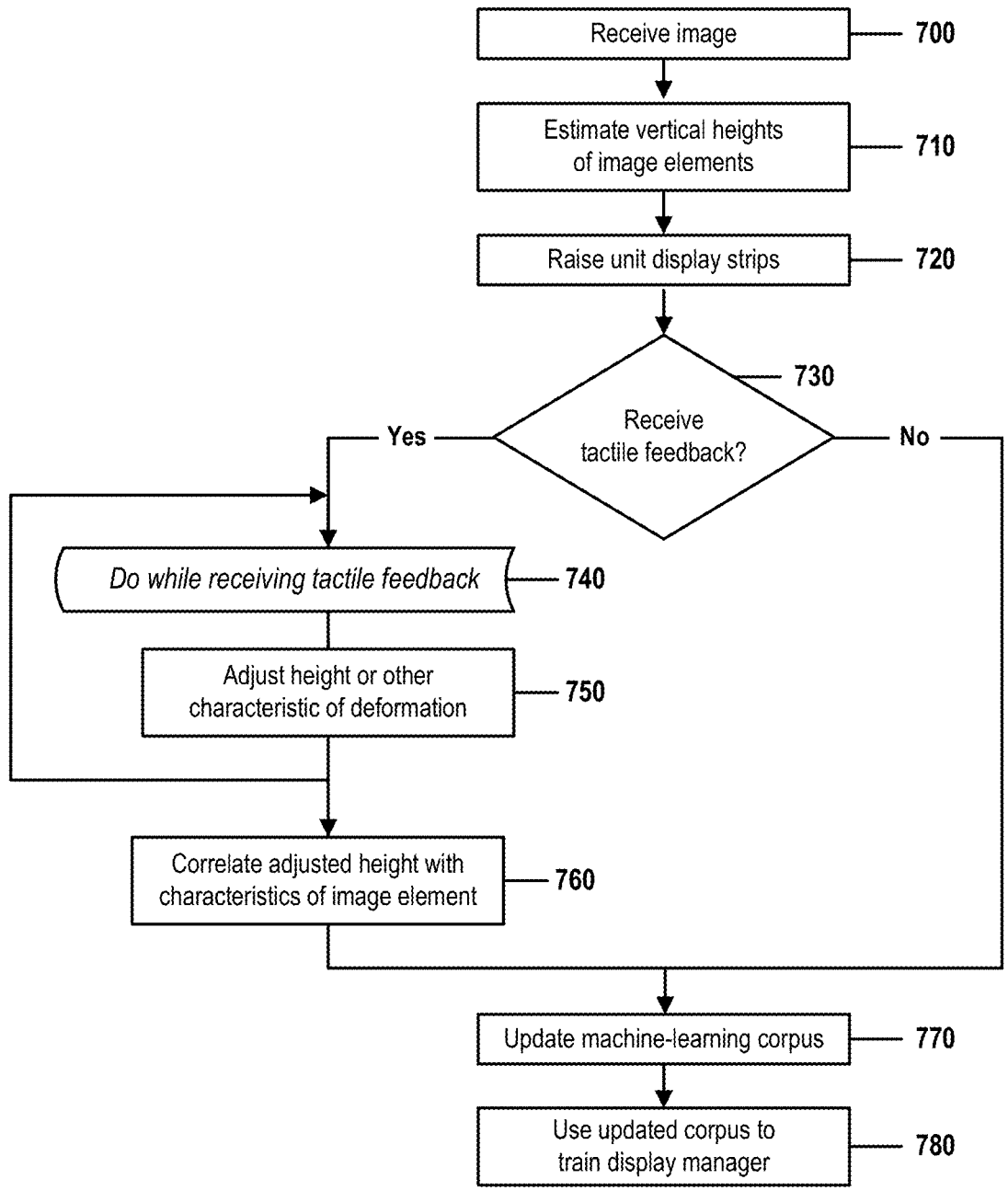
FIG. 7 is a flow chart that illustrates the steps of a method for a self-learning deforming display in accordance with embodiments of the present invention.

FIG. 7 is a flow chart that illustrates the steps of a method for a self-learning deforming display in accordance with embodiments of the present invention. FIG. 7 contains steps 700-780, which may be performed by embodiments that incorporate elements of FIGS. 1-6.

In step 700, deformable display 210 or self-learning display manager 220 receives an image from to display by a means known in the art. This image may be a graphic, a frame of a video or animation, or any other displayable content. If the display 220 displays interlaced video, the image may comprise multiple fields, combined into a single frame by display manager 220, or characteristics of the image may be inferred by display 220 from a single field, even if the single field does not contain information for every pixel of the display 220.

In step 710, display manager 220 determines which regions of the received image represent surfaces, objects, or other visual elements positioned at a height above other elements of the image. For example, if the image is an overhead aerial image of an urban neighborhood, rooftops, trees, and vehicles would all be positioned at a height above street level. If the image is a frame of an animated graphic, display manager 220 would determine that a graphical element that has appeared to be moving toward the viewer in a preceding frame sequence would be positioned at a height above the default plane of the image that is slightly greater than the height of an analogous graphic in a most recent frame. If the image is generated by a graphical user interface of a secured application, display manager 220 could determine that a security frame around confidential user-account data should be raised in order to limit the ability of unauthorized persons from viewing the user's private data.

In step 720, display manager 220 forward the received image to the display 210, if the display 210 has not already received the image. Display manager 220 also directs inflatable mechanisms in display layer 520 to raise regions of the deformable surface 5000 of display 210. These raised deformations may be determined by any means known in the art. For example, a cognitive or artificially intelligent display manager 220 could make such a determination by following rules stored in knowledgebase 240. These rules could, for example, identify a correlation between a vertical height of a region of the image and certain characteristics of the image, such as a detected edge, a certain type of difference between contrast, color, hue, texture, or brightness of different pixel areas, or a recognition of a certain type of known visual element.

In other cases, a raised deformation may be inferred, through known cognitive or noncognitive means, from characteristics of elements of multiple frames of a video, or an animation. For example, if an element of an earlier frame had previously been identified as moving laterally across the screen at a particular height above the default surface of the screen, display manager 220 would have previously deformed display 210 to raise the region of pixels that represented the moving element in the previous frame. When identifying that the currently received frame represents the element in continued motion across the screen, display manager 220 would continue to deform display 210, extruding the region of pixels that represents the moving element in its current position.

As described above, an extrinsic application may direct display manager 220 to generate a particular a deformation in a particular shape, height, texture, or location in order to satisfy requirements or intent of the application. Such applications include, but are not limited to, animation players, graphical user interfaces, presentation applications, document viewers, photo and video editors, and Web browsers.

The physical height of each deformation may fully conform with desires or intent of a viewer or extrinsic application. Knowledgebase rules, may provide only relative heights of deformations, stating, for example, that a higher-contrast border around a visual element could correspond to a greater height above the default plane.

Deformation heights may also be subject to physical constraints as functions of the resolution, width, and length of the display, requiring a deformation to comprise different heights on different size displays, or to comprise different degrees of detail on different resolution displays.

Users may also desire different heights of specific deformations, or a different overall scale of heights across an entire image, depending on the user's physical environment or upon the type of device that comprises the deformed display 210. For example, a deformation may have greater height on a wall-mounted large-screen computer monitor than it would on a small smartphone screen.

Characteristics of the inflation mechanisms 500*a*-500*c* can introduce additional considerations. Differences in the physical characteristics of balloons, in the gas-transportation tubework used to inflate the balloons, or in the mechanisms that hold the balloons in place can result in two balloons exerting different degrees of upward pressure on the deformable surface 5000, even if the two balloons are inflated with a same amount of gas.

Additional complexity is introduced when multiple deformations overlap or are in proximity to each other. For example, a balloon may have to exert less pressure on the deformable surface 210 in order to raise a particular unit display strip 310 to a height of 0.4 inches, if a second deformation has already raised other strips located near to the particular strip 310. Even more challenging, when multiple overlapping deformations are needed to extrude a complex textured or irregularly shaped raised region, interactions between proximate balloons may greatly complicate determinations of how much fluid should be forced into each balloon. Even when generating a simple deformation, if that deformation is large enough to span numerous inflation mechanisms 500a-500c, determining how pressure exerted by each inflated mechanism 500b1 affects the amount of pressure that must be exerted by other mechanisms 500a-500c may require complex computations.

For these reasons and because of other implementation-dependent technical constraints, embodiments of the present invention may in step 720 produce only estimated deformations. As described in subsequent steps of FIG. 7, the self-learning display 210 will, by means of artificial intelligence and machine-learning technologies, learn over time how to more precisely deform display 220 to produce the deformations that comprise heights, shapes, and other characteristics that are most satisfactory to a viewer.

In step 730, the method of FIG. 7 determines whether display manager 220 has received tactile feedback from a viewer, through a touch-sensitive surface of display 210 or through another means known in the art. In some embodiments, this user feedback may be received through a means other than a touch-sensitive display, such as through a keyboard cursor pad, a keyboard shortcut, a touchpad, or a mouse button.

If display manager 220 determines that tactile feedback has been received, steps 740-760 are performed. In some embodiments, display manager 220 will continue to display incoming images while steps 740-760 are performed. During that time, display manager 220 may not perform additional deformations in response to the additional received images. In other cases, display manager 220 may freeze the screen during the performance of steps 740-760, allowing a user to modify deformations that existed when the tactile feedback was initiated, and while viewing the corresponding image received in step 700. Certain embodiments may offer all these options, under control of the viewer.

Step 740 begins an iterative procedure of steps 740-750, which continues so long as tactile feedback continues to be received or until a user confirms that the tactile feedback has concluded. This confirmation may be submitted by the user through means known in the art, such as by tapping a certain area of display 210, typing a certain key combination, submitting a voice command, completely removing a finger from a touch-sensitive surface for a specified duration of time, or clicking a mouse.

In step 750, display manager 220 reacts to the detected tactile feedback by altering one or more deformations of display 210. For example, if the tactile feedback consists of sustained finger pressure on a deformation, display manager 220 could respond by continuously increasing or decreasing the height of the deformation at the position on the surface of display 210 where the finger pressure is exerted until the finger is removed from the surface of the display 210. In another example, display manager 220 could respond to the finger pressure by continuously increasing or decreasing the height of the entire deformation until the finger pressure is removed.

As described earlier, embodiments may comprise the ability for display manager 220 to alter a characteristic of one or more deformations in other ways, in response to a detection of tactile feedback. For example, the height of deformations throughout a specific region of the display 210, or even across the entire surface of the display, may all be increased or decreased simultaneously while the tactile feedback is detected.

In some embodiments, display manager 220 may increase or decrease deformation heights as a linear function of the magnitude of tactile-feedback pressure, but in other cases, deformation heights may be varied as a logarithmic, exponential, or other type of function of the pressure magnitude. The speed with which deformation heights change may also be a function of the magnitude or duration of the tactile feedback. For example, pressing the deformable surface 5000 with greater pressure could cause display manager 220 to change the height of a deformation more rapidly. Similarly, the speed at which the height varies could increase as a function of the duration of the tactile feedback.

Many other responses to various types of tactile feedback are possible, and tactile feedback can comprise combinations of multi-finger or multi-hand gestures on a touch-sensitive surface of display 210, which may be further modified or controlled by concurrent or noncurrent user actions on other input mechanisms, such as keyboards, mice, touchpads, biometric sensors, or voice interfaces. For example, a user might submit speak commands like "enlarge" or "shrink" in order to change the size of the area of the surface of display 210 that is affected by finger pressure. Similarly, a user might submit speak commands like "increase height" or "decrease height" in order to change the direction in which display manager changes the height of a deformation that that is being subjected tactile feedback.

In some embodiments, user feedback may direct display manager 220 to adjust other parameters of one or more deformations, such as a sharpness of an edge, a smoothness of a surface texture, or a precision with which the deformation tracks a detected edge in the received image.

The iterative procedure of steps 740 and 750 ends when display manager 220 determines that the user has ended the tactile feedback detected in step 730, or when the user manually specifies that the deformation has been successfully adjusted.

In step 760, display manager 220 infers a correlation between any user-directed adjustments of steps 740-750 with characteristics of the received image. For example, if the user has reduced the height of a deformed area of display 210, display manager 220 will note that characteristics of the visual element represented by the deformed area should be correlated with a lower height than had been determined in step 720.

Display manager 220 may use methods of artificial intelligence to generate more complex correlations. For example, if a user changes a deformation height associated with all but one of the visual elements that comprise a similar edge characteristic, display manager 220 may infer that some other characteristic of the visual elements should be considered to be a determinant of deformation height.

In some embodiments, display manager 220 intelligently uses these newly learned correlations to update rules stored in its knowledgebase 240. For example, in the preceding case, the display manager 220 would adjust a knowledgebase rule that had identified the similar edge characteristic as a sole determinant of deformation height for a particular type of visual element. The adjusted rule would instead identify a second characteristic that, together with the edge characteristic, should both be considered when determining the deformation height.

In certain embodiments, display manager 220 merely forwards the results of steps 720-760 to the machine-learning training module 230, or stores the results of steps 720-760 in a repository that is accessible by the training module 230. In such cases, when the training module 230 in step 780 later conducts a machine-learning training session based on the results of steps 720-760, either the display manager 220 or the training module 230 will update the knowledgebase rules to better accommodate knowledge that may be inferred from the results.

The results of steps 720-760 may comprise any information that an implementer deems necessary in order for display manager 220 to learn how to better deform display 210. This information may comprise characteristics of the tactile feedback, identification of knowledgebase rules that were implemented by display manager 220 when deforming display 220 in step 720, characteristics of visual elements that had been identified by the knowledgebase rules or that had been later identified by the display manager 220 after receiving the user's tactile feedback.

In step 770, training module 230 formats information inferred from the results of steps 720-760 into a form that is compatible with the contents of machine-learning corpus 250, such as a vector format. Training module 230 then stores the inferred information in the corpus 250.

In step 780, training module 230 at a later time conducts a machine-learning training session, using information stored in corpus 250 to train display manager 220 to more accurately deform display 210 in response to characteristics of displayed content. Display manager 220 may gain this experience by analyzing user responses to past deformations, distinguishing cases when a deformation decision resulted in a user modifying that decision through tactile feedback from cases when a deformation decision was accepted by a user without modification.

As in other machine-learning applications, self-learning display manager 220 will in this way ultimately learn how to consistently deform a particular display 210 in a manner that is satisfactory to a particular user. This will eventually result in deformation decisions that are rarely adjusted by the user because the decisions are based on a mature set of knowledgebase rules "taught" to the system by past user feedback.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A computer system comprising: a processor, a deformable display surface, a memory coupled to the processor, and a computer-readable hardware storage device coupled to the processor, the storage device containing program code configured to be run by the processor via the memory to implement a method for a self-learning deforming display, the method comprising:
    the system, in response to determining that a displayed image comprises a three-dimensional visual element, deforming the deformable display surface by raising or lowering a contiguous area of the deformable display surface that represents the visual element;
    the system, in response to detecting an external physical pressure exerted upon the contiguous area, adjusting a height of at least a portion of the contiguous area until the system can no longer detect the external physical pressure;
    the system recording characteristics of the visual element, of the deformation, of the external physical pressure, and of the adjusting the height;
    the system submitting the recorded characteristics to a machine-learning training component of the electronic display system; and
    the system receiving training from the machine-learning training component,
        where the training comprises analysis of a corpus into which the machine-learning training component has incorporated the recorded characteristics, and
        where the system learns from the training how to more accurately deform the deformable display surface in response to a future determination that displayed content comprises one or more three-dimensional visual elements.

2. The system of claim 1,
where the deformable display surface comprises a flexible upper layer of display strips and a flexible lower layer of display strips,
where the upper layer of display strips is stacked above and is adjacent to the lower layer of display strips,
where the system displays a first image by directing each display strip of the upper and lower layers to display a portion of the first image, and
where the entire first image is visible to viewers as a combination of: i) portions of the first image that are displayed on the upper-layer display strips, and ii) portions of the first image that are displayed on the lower-layer display strips and that are visible through gaps between the upper-layer display strips.

3. The system of claim 2,
where the deformable display surface further comprises a rigid layer of deforming mechanisms that is stacked below and is adjacent to the flexible lower layer of display strips, and
where deforming a first area of the deformable surface that corresponds to a first visual element of the first image comprises directing one or more of the deforming mechanisms to exert an upward force that raises regions of the upper and lower layers of display strips that correspond to the first visual element.

4. The system of claim 2, where the lower-layer display strips are embedded into an elastic sheet that allows the upper-layer display strips and the lower-layer display strips to shift position when the deformable display surface is deformed.

5. The system of claim 1, where a second external input determines a characteristic of the adjusting the height.

6. The system of claim 5, where the characteristic identifies whether the adjusting consists of increasing the height or decreasing the height.

7. The system of claim 6, where the characteristic identifies a rate at which the height is adjusted.

8. The system of claim 1,
where the external physical pressure is exerted by a first user, and
where the system further learns from the training how to more accurately deform the display in response to future external pressures exerted by the first user.

9. The system of claim 1, where each display strip comprises flexible organic light-emitting diode (OLED) technology.

10. The system of claim 1, where each display strip is rigid.

11. A computer-implemented method comprising:
a self-learning electronic display system, in response to determining that a displayed image comprises a three-dimensional visual element, deforming a deformable display surface by raising or lowering a contiguous area of the deformable display surface that represents the visual element;
the system, in response to detecting an external physical pressure exerted upon the contiguous area, adjusting a height of at least a portion of the contiguous area until the system can no longer detect the external physical pressure;
the system recording characteristics of the visual element, of the deformation, of the external physical pressure, and of the adjusting the height;
the system submitting the recorded characteristics to a machine-learning training component of the electronic display system; and
the system receiving training from the machine-learning training component,
where the training comprises analysis of a corpus into which the machine-learning training component has incorporated the recorded characteristics, and
where the system learns from the training how to more accurately deform the deformable display surface in response to a future determination that displayed content comprises one or more three-dimensional visual elements.

12. The method of claim 1,
where the deformable display surface comprises a flexible upper layer of display strips and a flexible lower layer of display strips,
where the upper layer of display strips is stacked above and is adjacent to the lower layer of display strips,
where the lower-layer display strips are embedded into an elastic sheet that allows the upper-layer display strips and the lower-layer display strips to shift position when the deformable display surface is deformed,
where the system displays a first image by directing each display strip of the upper and lower layers to display a portion of the first image,
where the entire first image is visible to viewers as a combination of: i) portions of the first image that are displayed on the upper-layer display strips, and ii) portions of the first image that are displayed on the lower-layer display strips and that are visible through gaps between the upper-layer display strips,
where the deformable display surface further comprises a rigid layer of deforming mechanisms that is stacked below and is adjacent to the flexible lower layer of display strips, and
where deforming a first area of the deformable surface that corresponds to a first visual element of the first image comprises directing one or more of the deforming mechanisms to exert an upward force that raises regions of the upper and lower layers of display strips that correspond to the first visual element.

13. The method of claim 11, where a second external input identifies whether the adjusting consists of increasing the height or decreasing the height.

14. The method of claim 11,
where the external physical pressure is exerted by a first user, and
where the system further learns from the training how to more accurately deform the display in response to future external pressures exerted by the first user.

15. The method of claim 11, further comprising providing at least one support service for at least one of creating, integrating, hosting, maintaining, and deploying computer-readable program code in the computer system, wherein the computer-readable program code in combination with the computer system is configured to implement the determining, the deforming, the detecting, the adjusting, the recording, the submitting, and the receiving.

16. A computer program product comprising a computer-readable hardware storage device having a computer-readable program code stored therein, the program code configured to be executed by a self-learning electronic display system comprising a processor, a deformable display surface, a memory coupled to the processor, and a computer-readable hardware storage device coupled to the processor, the storage device containing program code configured to be run by the processor via the memory to implement a method for a self-learning deforming display, the method comprising:
the self-learning electronic display system, in response to determining that a displayed image comprises a three-dimensional visual element, deforming a deformable display surface by raising or lowering a contiguous area of the deformable display surface that represents the visual element;
the system, in response to detecting an external physical pressure exerted upon the contiguous area, adjusting a height of at least a portion of the contiguous area until the system can no longer detect the external physical pressure;
the system recording characteristics of the visual element, of the deformation, of the external physical pressure, and of the adjusting the height;
the system submitting the recorded characteristics to a machine-learning training component of the electronic display system; and
the system receiving training from the machine-learning training component,
where the training comprises analysis of a corpus into which the machine-learning training component has incorporated the recorded characteristics, and
where the system learns from the training how to more accurately deform the deformable display surface in response to a future determination that displayed content comprises one or more three-dimensional visual elements.

17. The computer program product of claim 16,
where the deformable display surface comprises a flexible upper layer of display strips and a flexible lower layer of display strips,
where the upper layer of display strips is stacked above and is adjacent to the lower layer of display strips,
where the lower-layer display strips are embedded into an elastic sheet that allows the upper-layer display strips and the lower-layer display strips to shift position when the deformable display surface is deformed, where the system displays a first image by directing each display strip of the upper and lower layers to display a portion of the first image, where the entire first image is visible to viewers as a combination of: i) portions of the first image that are displayed on the upper-layer display strips, and ii) portions of the first image that are displayed on the lower-layer display strips and that are visible through gaps between the upper-layer display strips, where the deformable display surface further comprises a rigid layer of deforming mechanisms that is stacked below and is adjacent to the flexible lower layer of display strips, and where deforming a first area of the deformable surface that corresponds to a first visual element of the first image comprises directing one or more of the deforming mechanisms to exert an upward force that raises regions of the upper and lower layers of display strips that correspond to the first visual element.

18. The computer program product of claim 16, where a second external input identifies whether the adjusting consists of increasing the height or decreasing the height.

19. The computer program product of claim 16,
where the external physical pressure is exerted by a first user, and
where the system further learns from the training how to more accurately deform the display in response to future external pressures exerted by the first user.

* * * * *